United States Patent [19]

Melchior

[11] Patent Number: 5,507,254
[45] Date of Patent: Apr. 16, 1996

[54] VARIABLE PHASE COUPLING FOR THE TRANSMISSION OF ALTERNATING TORQUES

[76] Inventor: Jean F. Melchior, Diesel Propulsion II Rue Denis Popin, 78190 Teappes, France

[21] Appl. No.: 484,787

[22] Filed: Jun. 7, 1995

Related U.S. Application Data

[63] Continuation of Ser. No. 978,890, Nov. 19, 1992, which is a continuation of Ser. No. 576,451, Sep. 13, 1990.

[30] Foreign Application Priority Data

Jan. 13, 1989 [FR] France ................................. 89 00366

[51] Int. Cl.⁶ ................................................ F01L 1/34
[52] U.S. Cl. ........................................ 123/90.17; 123/90.31
[58] Field of Search .......................... 123/90.12, 90.13, 123/90.15, 90.17, 90.31

[56] References Cited

U.S. PATENT DOCUMENTS

| | | | |
|---|---|---|---|
| 2,159,017 | 5/1939 | Duncan | 123/90.15 |
| 2,191,459 | 2/1940 | Duncan | 123/90.17 |
| 2,305,787 | 12/1942 | Kales | 123/90.15 |
| 2,326,329 | 8/1943 | Camp | 123/90.15 |
| 2,488,361 | 11/1949 | Witzky et al | 74/395 |
| 2,773,490 | 12/1956 | Miller | 123/432 |
| 2,804,061 | 8/1957 | Gamble | 123/90.18 |
| 2,861,557 | 11/1958 | Stolte | 123/90.15 |
| 2,936,575 | 5/1960 | Lieberherr | 123/90.16 |

(List continued on next page.)

FOREIGN PATENT DOCUMENTS

| | | |
|---|---|---|
| 0163046 | 12/1985 | European Pat. Off. . |
| 0266511 | 5/1988 | European Pat. Off. . |
| 1085087 | 1/1955 | France . |
| 2187051 | 1/1974 | France . |
| 1081718 | 5/1960 | Germany . |
| 2032581 | 2/1971 | Germany . |
| 1947362 | 4/1971 | Germany . |
| 2525746 | 6/1975 | Germany . |
| 3247916 | 6/1984 | Germany . |
| 3701867 | 8/1988 | Germany . |
| 375951 | 10/1939 | Italy . |
| 61-268810 | 5/1985 | Japan . |
| 62-292615 | 11/1987 | Japan . |
| 1303528 | 1/1973 | United Kingdom . |
| 1413099 | 11/1975 | United Kingdom . |
| 2217812 | 11/1991 | United Kingdom . |
| 89/10469 | 11/1989 | WIPO . |
| 90/08248 | 7/1990 | WIPO . |

OTHER PUBLICATIONS

Evans—"Automotive Engine Alternatives"; 1987.
Ma—"Computer Simulation of an Otto–Atkinson Cycle Engine with Variable Timing Multi–Intake Valves and Variable Compressio Ratio"; 1988.
Ma—"Effect of Variable Engine Valve Timing on Fuel Economy"; (SAE 1988).
Scott—"Eccentric Cam Drive Varies Valve Timing", Automotive Engineerng (Oct. 1980).
Ingold—"System for Automatic Variation of Phase Between Two Camshafts, Inserted into a 'Cassette' Module, with Sachs–Hurst Chain".
Stone—"Variable Valve Timing for IC Engines" Automotive Engineer.
Scott—"Variable Valve Timing Has Electronic Control" May, 1984.

*Primary Examiner*—Noah P. Kamen
*Attorney, Agent, or Firm*—Barnes, Kisselle, Raisch, Choate, Whittemore & Hulbert

[57] ABSTRACT

One of the driving and driven parts of the coupling is connected to a cylinder and the other to a piston which delimit therebetween two antagonistic chambers. The chambers have a substantially constant volume, are filled with a practically incompressible hydraulic liquid, and are interconnected through two unidirectional circuits which have opposite directions and each a substantially constant volume. A distributing device 22 is so arranged as to either bring into action one or the other of the unidirectional circuits, or to neutralize both of them.

19 Claims, 6 Drawing Sheets

U.S. PATENT DOCUMENTS

| | | | |
|---|---|---|---|
| 2,958,315 | 11/1960 | Williams | 123/65 VC |
| 3,004,410 | 10/1961 | Pierce | 123/90.15 |
| 3,109,417 | 11/1963 | Bekkala et al. | 123/90.15 |
| 3,331,256 | 7/1967 | Morris | 74/397 |
| 3,369,532 | 2/1968 | McIlroy | 123/90.16 |
| 3,685,499 | 8/1972 | Meacham | 123/90.15 |
| 3,721,220 | 3/1973 | Garcea | 123/90.15 |
| 3,827,413 | 8/1974 | Meacham | 123/408 |
| 3,978,829 | 9/1976 | Takahashi | 123/90.15 |
| 4,131,096 | 12/1978 | Mitchell | 123/90.15 |
| 4,231,330 | 11/1980 | Garcea | 123/90.15 |
| 4,305,352 | 12/1981 | Oshima | 123/90.15 |
| 4,421,074 | 12/1983 | Garcea et al. | 123/90.15 |
| 4,481,912 | 11/1984 | Stwiorok et al. | 123/90.15 |
| 4,494,495 | 1/1985 | Nakamura et al. | 123/90.15 |
| 4,494,496 | 1/1985 | Nakamura et al. | 123/90.15 |
| 4,498,431 | 2/1985 | Nakamura et al. | 123/90.15 |
| 4,535,731 | 8/1985 | Banfi | 123/90.15 |
| 4,561,390 | 12/1985 | Nakamura et al. | 123/90.15 |
| 4,601,266 | 7/1986 | Oldfield et al. | 123/90.15 |
| 4,627,825 | 12/1986 | Bruss et al. | 464/2 |
| 4,685,429 | 8/1987 | Oyaizu | 123/90.15 |
| 4,708,101 | 11/1987 | Hara et al. | 123/90.16 |
| 4,714,057 | 12/1987 | Wichart | 123/90.15 |
| 4,723,517 | 2/1988 | Frost | 123/90.31 |
| 4,726,331 | 2/1988 | Oyaizu | 123/90.15 |
| 4,744,338 | 5/1988 | Sapienza, IV | 123/90.15 |
| 4,747,375 | 5/1988 | Williams | 123/90.15 |
| 4,762,097 | 8/1988 | Baker | 123/90.31 |
| 4,771,742 | 9/1988 | Nelson et al. | 123/90.17 |
| 4,785,635 | 11/1988 | Melchior et al. | 60/606 |
| 4,787,345 | 11/1988 | Thoma | 123/90.17 |
| 4,794,848 | 1/1989 | Melchior | 92/159 |
| 4,802,376 | 2/1989 | Stidworthy | 74/394 |
| 4,805,566 | 2/1989 | Ampferer | 123/90.15 |
| 4,805,571 | 2/1989 | Humphrey | 123/316 |
| 4,811,698 | 3/1989 | Akasaka et al. | 123/90.17 |
| 4,856,465 | 8/1989 | Denz et al. | 123/90.17 |
| 4,858,572 | 8/1989 | Shirai et al. | 123/90.12 |
| 4,895,113 | 1/1990 | Speier et al. | 123/90.17 |
| 4,903,650 | 2/1990 | Ohlendorf et al. | 123/90.17 |
| 4,938,121 | 7/1990 | Melchior | 92/110 |
| 5,002,023 | 3/1991 | Butterfield et al. | 123/90.15 |
| 5,014,663 | 5/1991 | Melchior | 123/257 |
| 5,018,354 | 5/1991 | Melchior et al. | 60/606 |
| 5,046,460 | 9/1991 | Butterfield et al. | 123/90.15 |
| 5,056,478 | 10/1991 | Ma | 123/90.17 |

5,507,254

VARIABLE PHASE COUPLING FOR THE TRANSMISSION OF ALTERNATING TORQUES

RELATED CO-PENDING APPLICATION

This application is a continuation of my co-pending application Ser. No. 07/978,890, filed Nov. 19, 1992, which in turn is a continuation of my co-pending application Ser. No. 07/576,451, filed Sep. 13, 1990.

FIELD OF THE INVENTION

The invention relates to a coupling having a variable phase in operation. This coupling is for the transmission of an alternating torque between a driving part intended to be connected to a driving shaft, and a driven part intended to be connected to a shaft which is normally driven. These parts are subjected in operation to alternating resistant and driving torques. One of the driving and driven parts of the coupling is connected to a cylinder and the other to a piston (or similar such slidable member, generally referred to as "piston" hereinafter) which delimit therebetween at least two antagonistic chambers. Thus, there corresponds to an angular phase difference value between the two shafts a relative and single position between the piston and cylinder. The two chambers have a substantially constant total volume and are filled with a hydraulic liquid which is practically incompressible at the normal operating pressures.

The invention concerns more particularly, but not exclusively, couplings intended to be disposed between the main shaft of an internal combustion engine and at least one camshaft of the engine, the engine having valves and/or injectors actuated by this camshaft. These couplings are for the purpose of varying in operation the angular setting of the camshaft with respect to the main shaft of the engine. Indeed, in one of these cases, the camshaft is subjected cyclically below the coupling to resistant torques when the rising profiles of the cams open the valves against the action of the usual elastic return means for the latter, and then to driving torques when these return means close the valves by causing them to follow along the descending profiles of the cams. The same is true in the case where the camshaft actuates injectors.

BACKGROUND OF THE INVENTION

Known couplings, of the type defined above employ an exterior power means such as a source of fluid under pressure (see U.S. Pat. No. 2,958,315 and FR-A-2,187,051 and 1,085,087).

SUMMARY OF THE INVENTION

An object of the invention is to arrange the couplings of the type in question in such manner that it is possible to vary in operation the phase between the driving shaft and the normally driven shaft without use of a power means such as a source of fluid under pressure. The invention also has for an object to render these couplings simpler, more compact, less costly and more reliable. It also has for an object to arrange these couplings in such a manner that they allow a large angular difference between the driving shaft and the driven shaft without resulting in angular vibrations. It finally has for an object to allow a rapid phase shift between the driving shaft and the driven shaft.

To this end, the coupling of the type defined hereinbefore is essentially characterized in that the two chambers are interconnected by two unidirectional communication circuits having opposite directions and each having a substantially constant volume. The coupling comprises distributing means arranged in such manner as to either bring into action either of these communication circuits while neutralizing the other, or to neutralize both of them. The action of the distributing means depends on whether the phase difference between the driving and driven parts of the coupling must be either increased or decreased, or maintained constant.

In this way, it is possible to benefit from the differences in the pressures of the hydraulic liquid, which are alternately positive and negative, between two antagonistic chambers of the piston-cylinder assembly for increasing the volume of one or the other of these chambers and correlatively decreasing the volume of the opposite chamber. This is accomplished with the joint action of the unidirectional communication circuits and distribution means, which thereby vary the phase difference in the desired sense by an exchange of hydraulic liquid between the two chambers.

The invention also relates to internal combustion engines provided with a coupling such as that defined hereinbefore between their main shaft and their camshaft or camshafts.

BRIEF DESCRIPTION OF THE DRAWINGS

The invention will be described in more detail hereinafter with the aid of the accompanying drawings.

Figure 7:
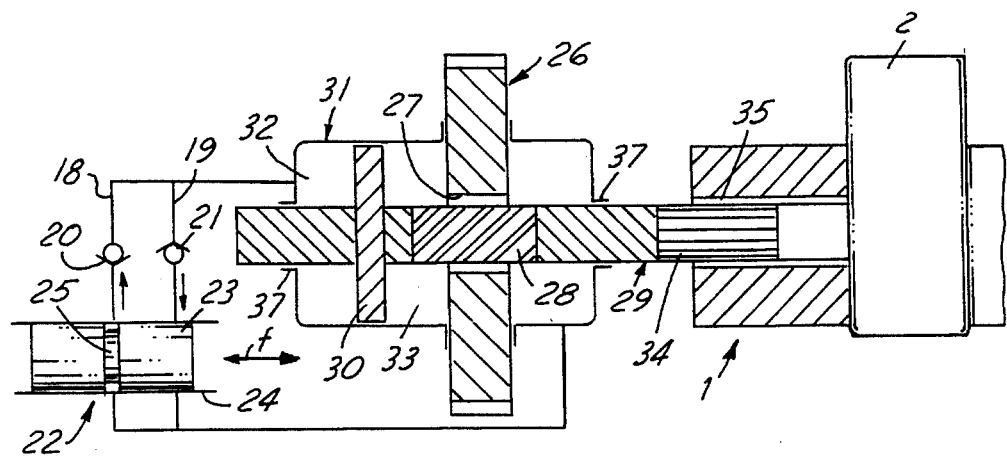
FIG. 7 illustrates a coupling arranged in accordance with a second embodiment of the invention having a cylinder and a piston undergoing relative movements of translation.
Figure 12:
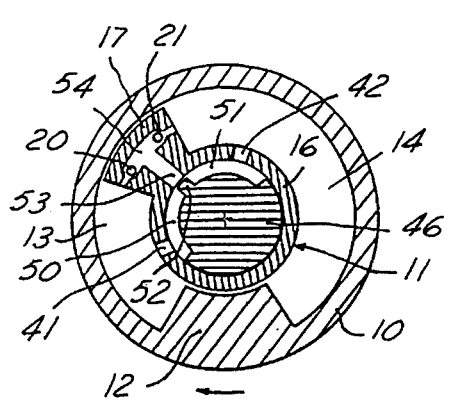
FIGS. 12 and 13 represent respectively by a cross-sectional view and an axial sectional view a coupling whose distributing means and communication circuits are incorporated in rotating parts of the coupling.
Figure 13:
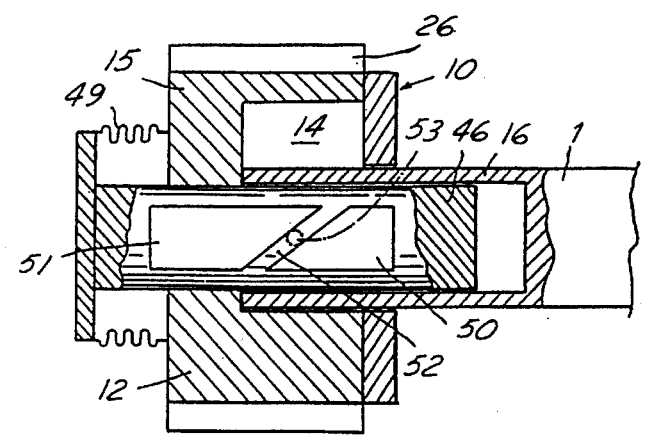
Figure 22:
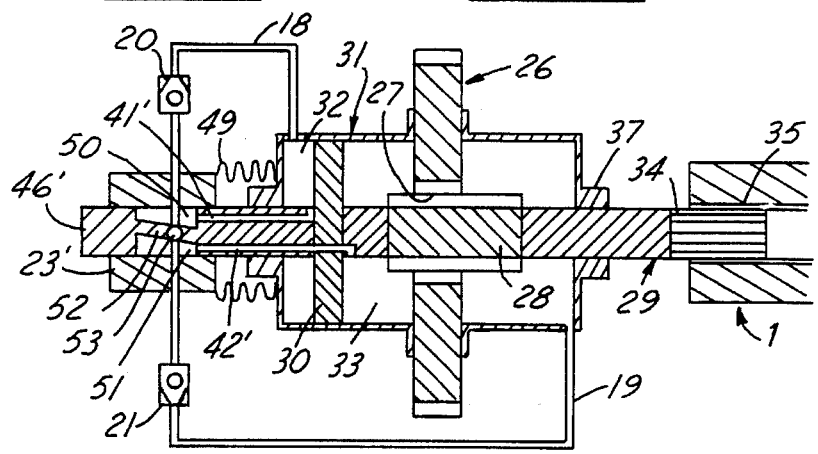

FIG. 22 is a diagrammatic illustration of a modified embodiment of the coupling illustrated in FIG. 7 with the hydraulic feedback loop control of phase shift feature of the coupling of FIGS. 12 and 13 incorporated therein to illustrate the application of these feature to this embodiment wherein the cylinder and piston undergo relative movements of translation, i.e., relative reciprocating movement.

Figure 23:
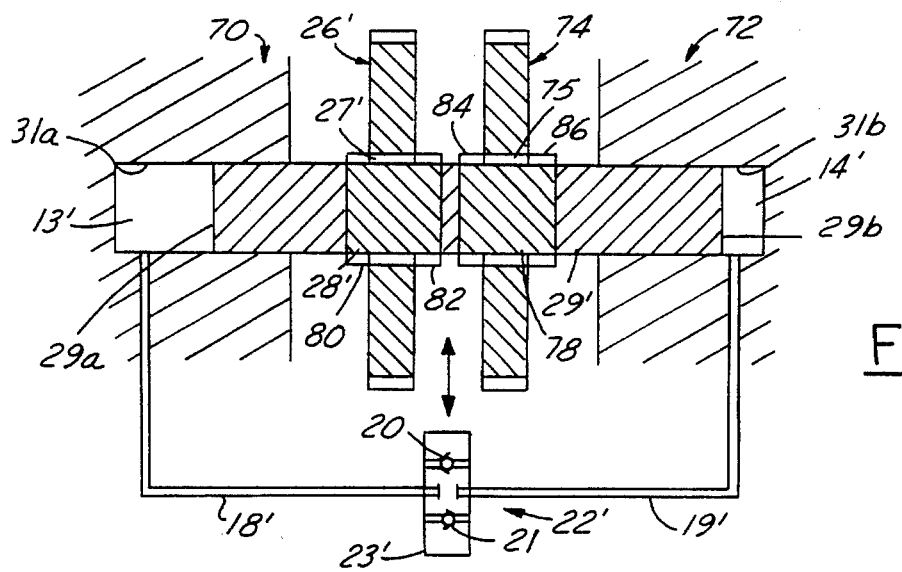

FIG. 23 is a simplified diagrammatic illustration of a variable phase coupling embodiment of the invention similar to the relatively reciprocating piston and cylinder embodiment of FIG. 7 but wherein the variable phase shift of the coupling is introduced between driving and driven gears of a chain or belt drive train between the crankshaft and camshaft.

Figure 24:
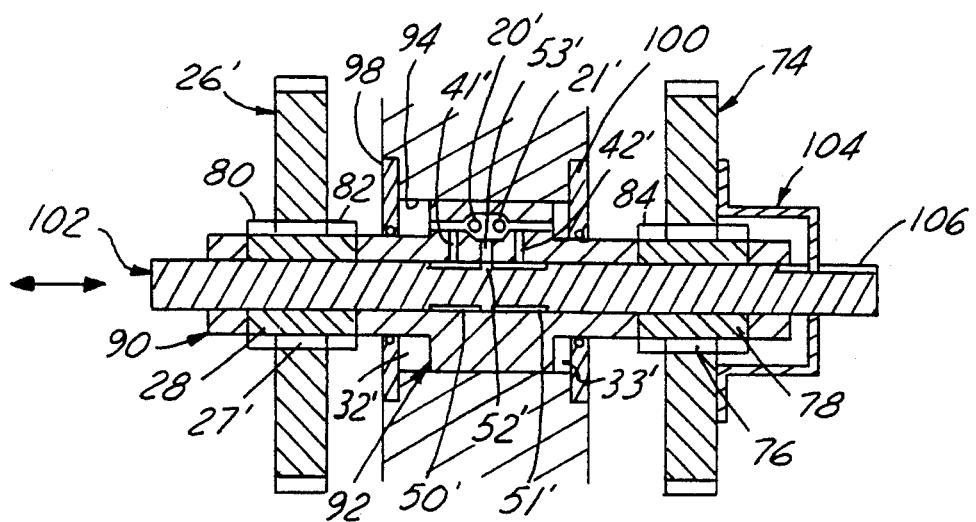

FIG. 24 is a simplified diagrammatic view of the type of variable phase shift coupling illustrated in FIG. 23 and provided with the built-in hydraulic feedback to provide with closed loop feedback control of phase shift of the type embodied in the coupling of FIGS. 12 and 13.

Figure 9:
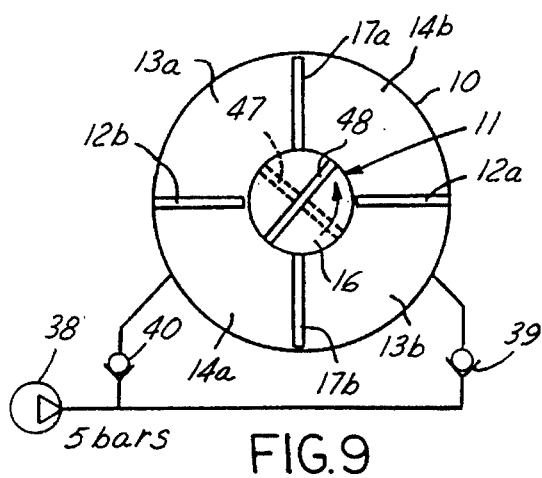
FIG. 9 represents an improvement of the embodiment of FIG. 3.
Figure 25:
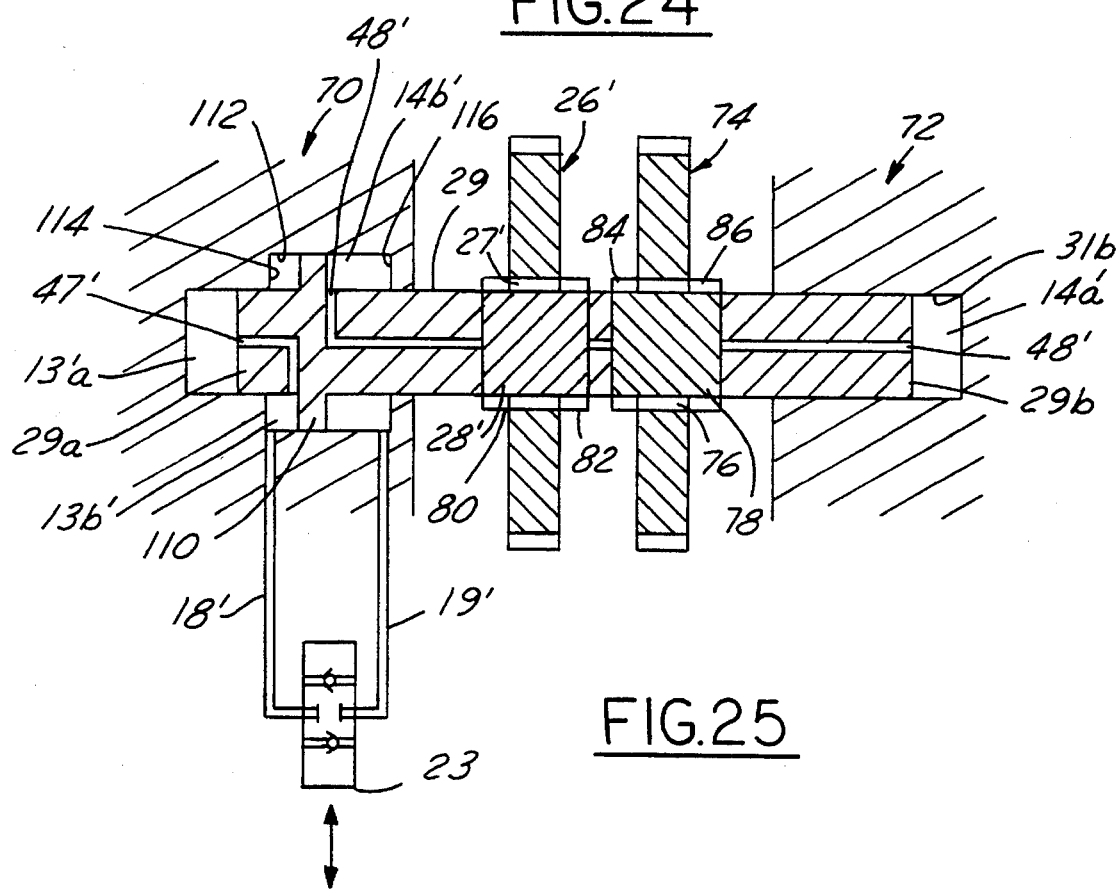

FIG. 25 is a simplified diagrammatic view of the type of variable phase shift coupling shown in FIG. 23 but provided with the two pairs of antagonistic chambers of the coupling embodiment of FIG. 9 to thereby incorporate the passive parallel communication circuits of the FIG. 9 embodiment.

DETAILED DESCRIPTION OF THE PREFERRED EMBODIMENTS

The invention relates to a coupling which has a variable phase in operation. The coupling comprises a driving part intended to be connected directly or indirectly to a driving shaft, and a driven part intended to be connected directly or indirectly to a shaft which is normally driven. These shafts are, in operation, subjected to alternating resistant and driving torques.

Figure 1:
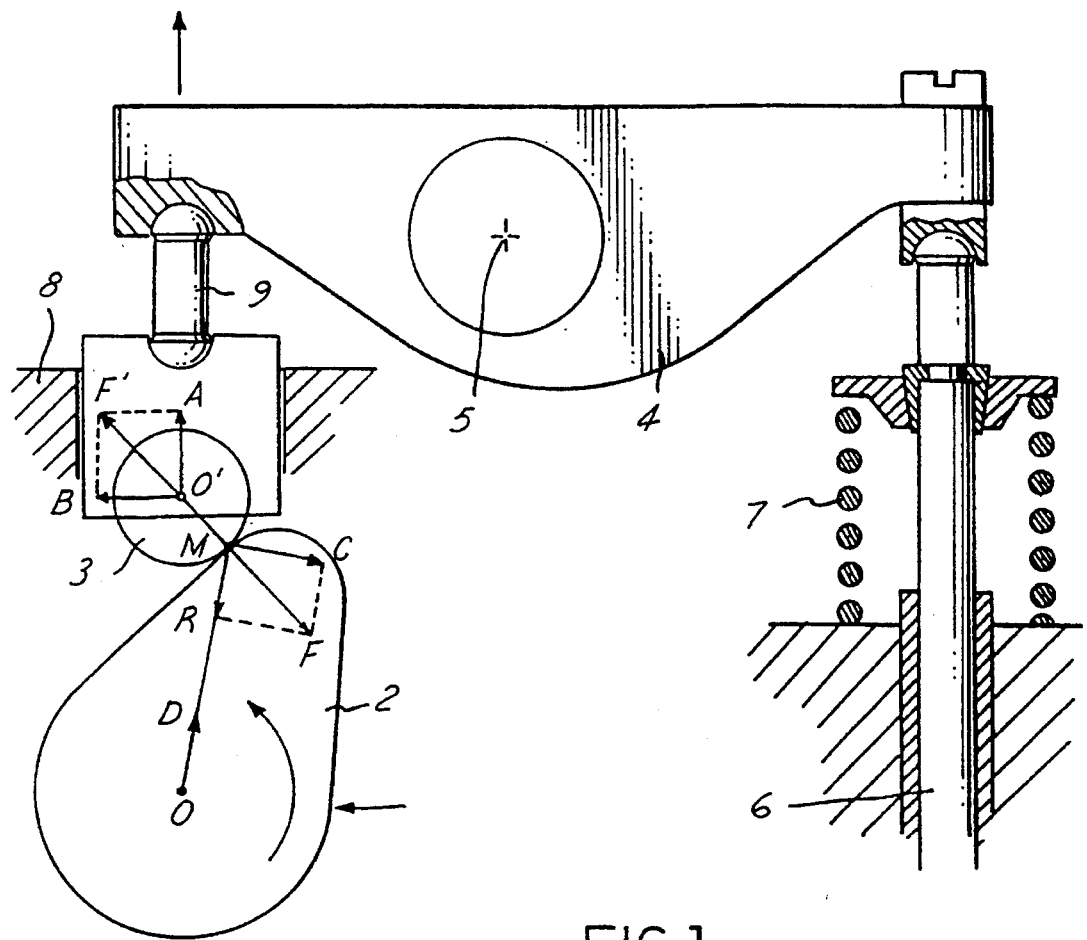
FIGS. 1 and 2 illustrate the distribution of forces and torques in camshaft mechanisms.
Figure 2:
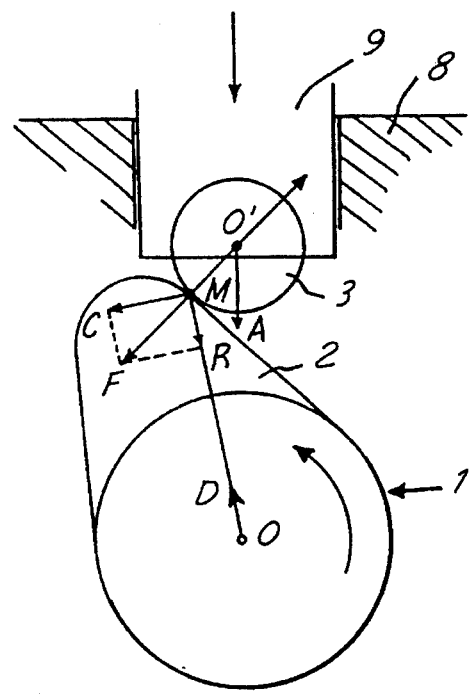

Before describing the invention, it would be of utility to recall how the forces and torques in a camshaft 1 such as that illustrated in FIGS. 1 and 2 are distributed.

The nose of the or each cam 2 of this shaft 1 drives a roller 3 at a point M. Through the medium of a rocker 4 which rocks about a shaft 5, the roller 3 tends to push the rod 6 of a valve against the action of a return spring 7.

In FIG. 1, the roller 3 in rising opposes the movement of the cam 2 by a force MF which is normal to the two surfaces in contact. This force is resolved into:

MR: transverse force applied to the camshaft 1 having an axis of rotation 0; and
MC: resistant torque applied to the cam 2.

The force MR is balanced by the reaction OD of the bearings of the shaft 1.

The force MF is balanced by the reaction O'F' of the roller 3. This reaction is resolved into O'B, the lateral reaction of the roller 3 on the frame (or the cylinder head) 8 in which it slides, and a vertical force O'A which raises the rod 9 of the rocker 4 and compresses the spring 7.

When, owing to the rotation of the shaft 1, the nose of the cam 2 escapes from the roller 3 (FIG. 2), the spring 7 is extended and the axial force O'A is reversed. This axial force applies to the cam 2 the force MF which is resolved into:

MF=MR+MC.

As the force MC is reversed relative to the direction of rotation of the shaft 1, the torque applied to the cam 2 which was resistant in the case of FIG. 1 is reversed and becomes a driving force in the case of FIG. 2. Consequently, the torque applied to the camshaft 1 is alternating.

Figure 3:
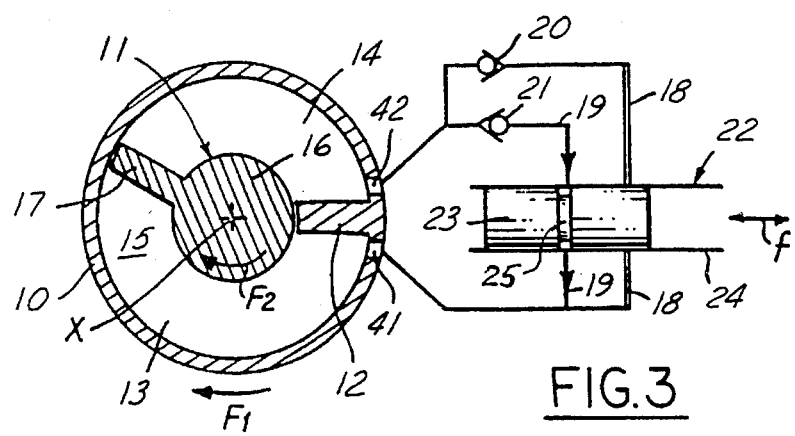
FIG. 3 illustrates a coupling arranged in accordance with a first embodiment of the invention, having a cylinder and a piston undergoing relative movements of rotation.

In the embodiment of the coupling diagrammatically represented in FIG. 3, one of the driving and driven parts of the coupling is connected to, or constituted by, a cylinder 10. The other of these parts is connected to, or constituted by, a piston 11 (or rotor piston as its movement is one of oscillation) which delimits or defines in the cylinder 10, together with a radial partition 12 fixed relative to the cylinder 10, two antagonistic chambers 13 and 14. In the embodiment of FIG. 3 in which the cylinder 10 and the piston 11 undergo relative movements of rotation, the cylinder 10 is constituted by a cylindrical case axially delimited by two transverse walls such as 15 (see also FIG. 13) and the piston 11 is constituted by a shaft 16 which extends through said transverse walls 15 in a sealed manner and carries a radial vane 17 which delimits the two chambers 13 and 14 while isolating them from each other. Apart from the elements 12 and 17, the cylinder 10 and the piston 11 both have a shape of revolution about an axis X about which they are so arranged as to be respectively rotatable in the direction of the arrows $F_1$ and $F_2$. The two chambers 13 and 14 have a substantially constant total volume, are filled with a liquid which is practically incompressible at the normal pressures of operation, and are interconnected by two unidirectional communication circuits 18 and 19 of opposite directions owing to the presence of check valves 20 and 21. Each of the circuits 18 and 19 has a substantially constant volume. The respective orifices through which the chambers 13 and 14 are connected to the circuits 18 and 19 are designated by 41 and 42. The coupling finally comprises distributing means 22 arranged in such manner as to bring into action or neutralize either of the circuits 18 and 19 and to avoid creating substantial pressure drops in the communication, when it exits, between the two chambers 13 and 14.

Figure 10:
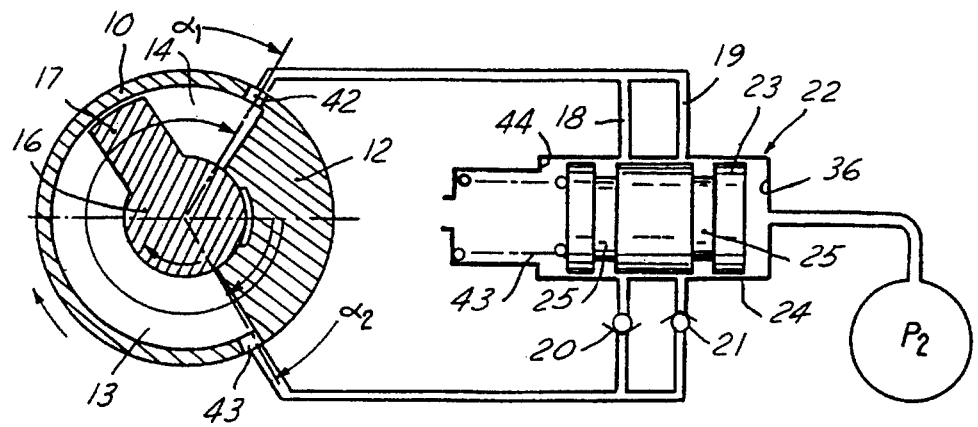
FIG. 10 illustrates the application of the coupling of FIG. 3 to the driving of the camshaft of an engine which is supercharged by a turbocompressor unit, FIG. 11 showing a diagram of operation thereof.

In the embodiment illustrated by way of example in FIG. 3, the distributing means 22 are constituted by a distributor having a slide 23 movable inside a body 24 as diagrammatically represented by the double sided arrow f. This slide 23 includes a groove or open passage 25 (or even two grooves as shown in FIG. 10) capable of ensuring, alternately, the continuity of the circuits 18 and 19, and full bearing surfaces for interrupting these same circuits. Lastly, sealing elements (not shown) are advantageously disposed on one hand on the partition 12 to cooperate with the cylindrical surface of the shaft 16, and on the other hand on the vane 17 to cooperate with the inner cylindrical surface of the cylinder 10.

The coupling represented diagrammatically in FIG. 3 operates in the following manner.

Figure 4:
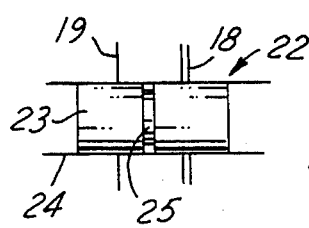
FIGS. 4 and 5 represent the distributor of FIG. 3 in two other positions of operation.
Figure 6:
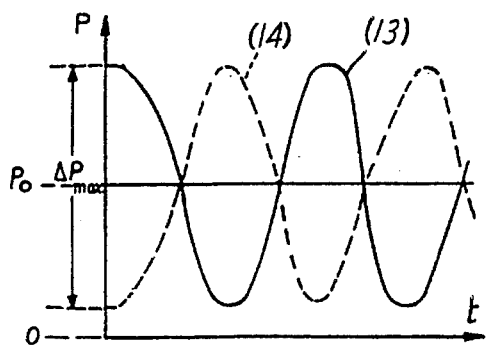
FIG. 6 shows, by means of a curve, how the pressure varies as a function of time in the chambers of the rotary cylinder of FIG. 3.

In the position represented in FIG. 4, the slide 23 presents the full parts in facing relation to the circuits 18 and 19 respectively. The two chambers 13 and 14 are therefore isolated from each other. The torque is transmitted by the hydrostatic compression of the liquid filling the two chambers, the cylinder 10 and the piston 11 rotating together about the axis X. The two shafts respectively connected to the cylinder 10 and the piston 11 rotate in synchronism with a phase difference Φ°. The pressure in each of the two chambers 13 and 14 varies with the same frequency as that of the torque to which the normally driven shaft is subjected, such as the shaft 1 in FIG. 1. This pressure variation varies in phase opposition in one chamber relative to the other as shown in FIG. 6 where the time t is plotted as abscissae and the pressure P in the chamber 13 (in full line) and the chamber 14 (in dotted line) are plotted as ordinates. This pressure may reach several hundred bars.

Figure 5:
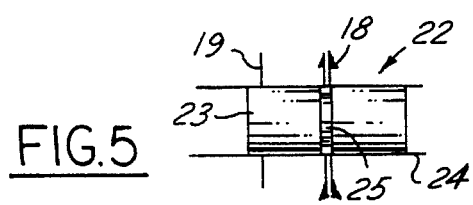

In the position represented in FIG. 5, the slide 23 presents the groove 25 in facing relation to the circuit 18 and a full part in facing relation to the circuit 19. This establishes a communication from the chamber 13 to the chamber 14 through the check valve 20 and prevents any communication from the chamber 14 to the chamber 13. When the pressure in the chamber 13 exceeds the pressure in the chamber 14, liquid flows from the chamber 13 to the chamber 14, which reduces the phase difference between the two shafts. When the pressure in the chamber 14 exceeds that in the chamber 13, no exchange of liquid occurs between the two chambers 13 and 14 and the phase difference remains unchanged. The desired phase difference between the two shafts is therefore established as a function of the duration of opening of the circuit 18, as will be explained in more detail hereinafter.

In the position represented in FIG. 3, the slide 23 presents the groove 25 in facing relation to the circuit 19 and a full part in facing relation to the circuit 18. For reasons opposite to those given with reference to FIG. 5, the phase difference increases each time the pressure in the chamber 14 exceeds the pressure in the chamber 13.

In any case, the phase difference between the driving part and the driven part is at the most equal to the maximum angular movement of the vane 17 in the cylinder 10 between the two faces of the radial partition 12, and it is adjusted by the duration of the opening of the circuit 18 or 19, taking into account the speed of transfer from one of the chambers 13, 14 to the other through the circuit 18 or 19. The dimensioning of these circuits permits adjusting the speed of change from one state to the other, which permits achieving high-speed variations in the phase difference. It can moreover be see that: after each phase shift, the phase is hydraulically set; and apart from leakages between the chambers 13 and 14, any mechanical oscillation is prevented, notwithstanding variations in the pressure of the hydrostatic liquid in said chambers. It can finally be seen that these effects are obtained without intervention of an exterior power means.

In the foregoing, it has been assumed, in order to simplify the description, that the coupling of FIG. 3 had only two opposed chambers 13 and 14. In reality, it is preferable to arrange that the coupling have at least two pairs of chambers opposed in pairs. Generally, it is sufficient, as shown in FIG. 9, to replace the chamber 13 by two opposed chambers 13a and 13b constantly interconnected through a passage 47, and the chamber 14 by two chambers 14a and 14b constantly interconnected through a passage 48. These chambers 13a, 14a, 13b and 14b alternate on the circumference of the cylinder 10. For this purpose it is sufficient to replace the partition 12 by two diametrically opposed partitions 12a and 12b, and the vane 17 by two diametrically opposed vanes 17a and 17b and to provide the passages 47 and 48 in the shaft 16 of the piston 11. This solution has, it is true, the drawback of reducing by one half the angular movement of the piston 11 relative to the cylinder 10, but has the important advantage of balancing the forces acting on these elements 10 and 11 in operation.

In the embodiment of FIG. 7, in which the cylinder and the piston (disk in this embodiment) undergo relative movements of translation, the coupling comprises a gear pinion 26 connected to a driving shaft (not shown). The gear pinion has oblique (helical) inner teeth 27 which are meshed with oblique (helical) outer teeth 28 carried by the rod 29 of a piston 30. Thus, a displacement in translation of the piston 30 results in a relative rotation of its rod 29 relative to the pinion 26. The piston 30 is movable in translation in a cylinder 31 which is fixed relative to the driving pinion and delimits with the piston two antagonistic chambers 32 and 33 similar to the chambers 13 and 14 of the embodiment of FIG. 3. As in this latter embodiment, the two chambers 32 and 33 are filled with a liquid which is practically incompressible at the normal pressures of operation and are interconnected through two unidirectional communication circuits 18 and 19 having check valves 20 and 21. Furthermore, the coupling comprises distributing means 22 arranged the same as those of FIG. 3. Lastly, the rod 29 comprises straight splines 34 which cooperate with straight grooves 35 provided inside the driven shaft, such as the camshaft 1 of FIG. 1. Still furthermore, sealing elements 37 are provided between the cylinder 31 and the slidable and rotatable rod 29 in addition to the usual sealing elements (not shown) between the cylinder 31 and the piston 30. For balancing purposes and for ensuring the constancy of the sum of the volumes of the two chambers 32 and 33, the rod 29 is mounted through the cylinder 31 on each side of the piston 30 by cylindrical bearing surfaces having equal sections.

The operation of the embodiment of FIG. 7 is similar to that of FIG. 3. Indeed, depending on the position of the slide 23 of the distributing means 22, the piston 30 is either: 1) maintained stationary in translation in the cylinder 31, in which case the phase is maintained constant between the driving shaft coupled to the pinion 26 and the driven shaft 1, or 2) shifted in translation in either direction inside the cylinder 31, in which case an angular phase shift occurs in either direction between the driving shaft and the driven shaft 1 owing to the cooperation of the oblique teeth 27 and 28.

Notwithstanding the interest of the variant of FIG. 7, the embodiment having a rotatable jack or piston of FIG. 3 is preferred for reasons of simplicity and compactness. It is therefore in respect of this embodiment that the variations in the pressure in the antagonistic chambers 13 and 14 will be explained (these variations being moreover similar but reduced by one half in the case where these chambers are doubled and alternated on the circumference of the cylinder 10, as mentioned hereinbefore).

It will first of all be assumed that the fluid filling the chambers 13 and 14 is incompressible, that the sum of the volumes of these two chambers is constant and that there is neither leakage between the two chambers, nor friction.

Figure 8:
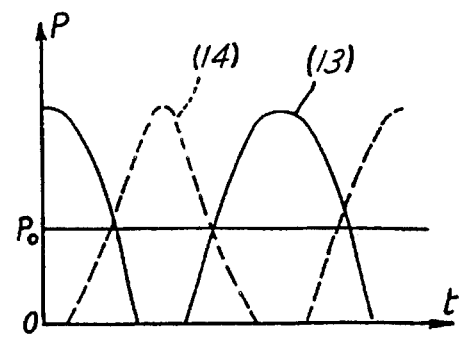
FIG. 8 is a curve permitting a comparison with that of FIG. 6.

If the mean pressure in the chambers 13 and 14 is termed $P_o$ and the maximum variation in the pressure in these chambers is termed $\Delta P_{max}$ two cases can arise:

$P_o > \Delta P_{max}/2$ (FIG. 6 ): the pressures in the chambers are always positive, or $P_o < \Delta P_{max}/2$ (FIG. 8): the pressure will be periodically cancelled out in the chambers 13 and 14 with creation of cavitation and pockets of vapor.

If, contrary to the aforementioned hypothesis, friction of the shafts and the pinions is taken into account, a continuous component corresponding to the resistant torque of the friction is added to the pressure.

In practice, the maximum variation in the pressure $\Delta P_{max}$ is very high (on the order of 200 to 300 bars). In order to avoid the formation of periodical depressions and cavitation, according to an improvement of the invention illustrated in FIG. 9, the chamber 13 (or 13a, 13b) and the chamber 14 (or 14a, 14b) are put into communication through unidirectional means or check valves 39 and 40 with a pump 38 having a low pressure, for example 5 bars. This pump may therefore be the oil pump of an internal combustion engine equipped with the coupling in question. Note that this pump is a make-up means (or a reserve supply of hydraulic liquid) and not a power means. And this pump is intended to compensate for possible leakages of hydraulic liquid to the exterior, and/or to compensate for small variations in volume resulting from the compression of the hydraulic liquid (which is not quite zero) or to compensate for small variations in volume from the deformation of the chambers and their communication circuits 18 and 19.

As the liquid is slightly compressible and the chambers 13 and 14 slightly deformable, the system behaves as a hydraulic pump. Indeed, assuming that the forced feeding pressure (pump 38) is 5 bars and the maximum variation in the pressure due to the alternating torque is 200 bars, in a first period:

the pressure rises to 100 bars in the chamber 13 and the volume of the latter decreases by the quantity corresponding to the compression of the liquid; and the pressure drops to 5 bars and less in the chamber 14, the check valve 40 opens and the chamber 14 draws in a quantity of liquid equal to the variation in the volume of this chamber.

In the following period, the phenomena are reversed and it is the check valve 39 which allows liquid through to the chamber 13.

Progressively, the two chambers 13 and 14 are filled and the mean pressure $P_o$ will then itself reach a value at least equal to one half of the maximum variation in the pressure to which the forced feed pressure is added. That pressure is, in the cited example, $P_o = 200/2+5 = 105$ bars.

In the foregoing, the step-by-step operation of the coupling according to the invention was explained in which, by causing the shifting of the distributing slide 23 in one direction or the other from its neutral or hydrostatic set position (FIG. 4) by pulses of durations $\Delta t$, the phase between the driving shaft and the driven shaft is varied by algebraic increments $\Delta \Phi$ ("open loop" operation or operation with no feedback).

But it would seem still more advantageous to adopt a "closed loop" operation or an operation with feedback. In the preferred embodiment of the coupling according to the invention, some parameters of operation of the engine provided with this coupling depend on the relative position of the main shaft of the engine and of the camshaft controlling the opening and closing of the valves. For example, in an internal combustion engine supercharged by at least one turbocompressor unit such as disclosed in the French Patent No. 85 16430 of 6 Nov. 1985 (Publication No. 2,589,518 and corresponding U.S. Pat. No. 4,995,348), the angle of opening of the (or each) exhaust valve, at the end of the expansion stroke of the piston, determines the temperature of the gases which enter the supercharging turbine of the engine. Thus, anticipating the opening of the exhaust, for a given load of the engine, increases the temperature and the pressure of the gases entering this turbine and, consequently, the pressure of the supercharging air $P_2$.

According to a development of the invention illustrated in FIG. 10, the position of the distributing slide 23 is controlled by at least one parameter of operation of the engine. In particular, the position is controlled by the pressure of the supercharging air $P_2$, for example by causing this pressure to act on one of the transverse faces of this slide 23 and causing a return spring 43 to act on its other transverse face. It is in this way possible to control the pressure of the supercharging air to prevent it, for example, from dropping below a certain threshold. This threshold may be, for example, the minimum threshold permitting the stable operation of an internal combustion engine having a compression-actuated ignition.

Figure 11:
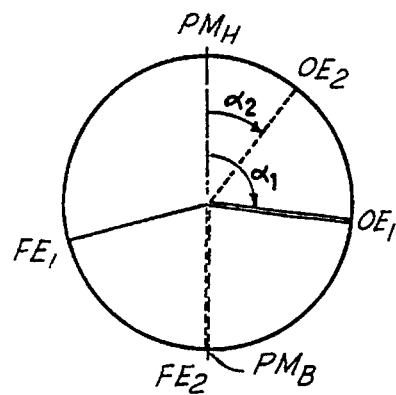

FIG. 11 shows, in an angular diagram where there are indicated in the usual way the top dead center (PMH) and the bottom dead center (PMB) of the piston of a cylinder of an engine equipped with the coupling of FIG. 10, the angle of opening $\alpha_1$ of the exhaust valve of this engine in normal operation and the angle of opening $\alpha_2$ of the same valve when operating at low pressure.

The opening of the exhaust is designated by OE and the closure of the exhaust by FE, and these symbols have the same index as the angles of opening.

In operating at high power, the supercharging pressure, which is high, acts on the distributing slide 23 (FIG. 10) which compresses the spring 43 and comes to bear against a mechanical stop 44. In this position, the slide 23 establishes communication in the direction from the chamber 14 to the chamber 13 through the check valve 21. Thus, owing to the transmission of the alternating torque (FIG. 6), each time the pressure in the chamber 14 exceeds that prevailing in the chamber 13, liquid flows from the chamber 14 to the chamber 13. The phase difference between the driving shaft and the driven shaft increases until the vane 17 comes into abutment against the partition 12. In this position, the angle of opening of the exhaust valve, measured relative to the position of the crankshaft at PMH, is maximum (FIG. 11).

In operating at low power, the supercharging pressure progressively decreases with the power developed by the engine until it reaches the value of said threshold below which the stable operation of the engine is no longer assured. In this situation, the action of the spring 43 on the distributing slide 23 overcomes that of the supercharging pressure, which causes the slide 23 to shift toward the right of FIG. 10 up to a stop 36. Consequently, there is an interruption of the cyclic communication in the direction from the chamber 14 to the chamber 13, and the opening of the cyclic communication in the direction from the chamber 13 to the chamber 14. The chamber 13 will progressively empty into the chamber 14, which will result in the reduction in the phase difference between the crankshaft (driving shaft) and the camshaft (driven shaft). Thus, the opening of the exhaust valve will occur earlier in the expansion stroke of the engine piston. This will increase the energy of the exhaust gases and accelerate the supercharging turbine by producing, by counter-reaction, the increase in the supercharging air pressure. This procedure will continue until the supercharging pressure resumes the threshold value assuring the stable operation of the engine.

In all of the embodiments of the invention represented in FIGS. 3 to 5, 7, 9 and 10 and described hereinbefore, it was assumed that the unidirectional communication circuits 18–21 and the distributing means 22 were located outside the cylinder and the piston of the coupling, in particular outside the rotary cylinder and piston 10 and 11. In fact, it is more advantageous to mount these circuits and means within the cylinder 10.

Such a construction is represented in FIGS. 12 and 13, FIG. 12 being a view similar to that of FIGS. 3, 9 and 10. FIG. 13 shows the elements of FIG. 12 in axial section, except for a distributing slide 46 which is in major part represented in elevation. In this case, the rotary cylinder 10 is connected to rotate with the driving shaft by means of a gear pinion 26 and the piston 11 having the vane 17 is connected to the driven shaft 1. The communication circuits 18 and 19 are provided in the rotary piston 11, it being possible to arrange for the check valves 20 and 21 to be carried by the vane 17. The shaft 16 of the piston 11 is hollow and carries internally the rotatable and slidable slide 46, which is substituted for the slidable slide 23 of the preceding embodiments. The slidable slide 46 rotates in synchronism with the driving shaft, i.e., with the rotatable cylinder 10, owing for example to the presence of a bellows 49 which connects the slide 46 to rotate with the cylinder 10 while allowing it to slide axially. The slide 46 includes two external recesses 50 and 51 separated by a rib 52 whose shape will be described hereinafter. The unidirectional communication circuits 18 and 19 comprise (as in the diagrams of FIGS. 3 to 5, 7 and 10) a common section which opens out through an orifice 53 in facing relation to either one of the recesses 50 and 51 or, as shown in dotted line in FIG. 13, in facing relation to the rib 52 which then obturates it. The recess 50 communicates with the chamber 13 through the orifice 41 and the recess 51 communicates with the chamber 14 through the orifice 42, the orifices 41 and 42 extending through the wall of the hollow shaft 16.

When the torque transmitted by the shaft 16 becomes resistant, the partition 12 compresses the liquid in the chamber 13 and decompresses the liquid in the chamber 14. The distributing slide 46 rotates at the same speed as the driving cylinder 10. If, owing to the compressibility of the hydraulic fluid and the leakages between the chambers 13 and 14, the phase difference $\Delta\Phi$ between the driving and driven shafts decreases, the rib 52 of the distributor 46 uncovers the orifice 53 which puts the chamber 54, located between the check valves 20 and 21, in communication with the chamber 13 owing to the orifice 41. An overpressure in the chamber 13 thus closes the check valves 20 and 21. When the torque transmitted by the driven shaft 1 becomes a driving torque owing for example to the action of the elastic return means 7 (FIG. 1), the vane 17 compresses the chamber 14 and decompresses the chamber 13. As the orifice 53 is uncovered owing to the phase shift in the course of the preceding alternation, increasing the pressure in the chamber 14 in communication with the chamber 13. This transfer of liquid from the chamber 14 to the chamber 13 increases the phase difference between the driving and driven shafts and consequently corrects the decrease in the phase difference which occurred during the preceding alternation. If this correction is excessive, it will be attenuated during the following alternation, and so on.

With this device, it can be seen that the orifice 53 becomes automatically set in facing relation to the rib 52 irrespective of leakages between the two chambers 13 and 14, provided these remain moderate.

The shape of the rib 52 permits determining the law of variation of the phase as a function of an exterior parameter. For example, in FIG. 13 where it has a helical shape, the phase difference between the two shafts will depend on the position of the distributor 46, which can be varied for example by modifying the pressure inside the bellows 49. Indeed, according to this axial position, the angular position of the orifice 53 will be automatically modified so that it is obturated by the rib 52.

Figure 14:
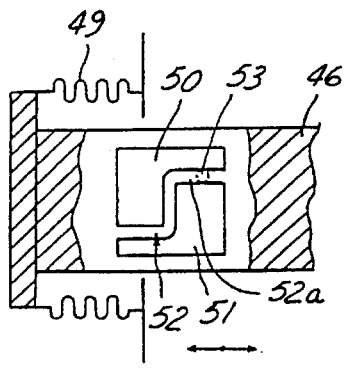
FIGS. 14 to 16 illustrate the application of the coupling of FIGS. 12 and 13 in the control of an internal combustion engine having a supercharging turbocompressor.
Figure 15:
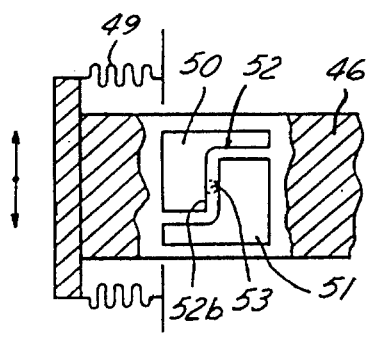
Figure 16:
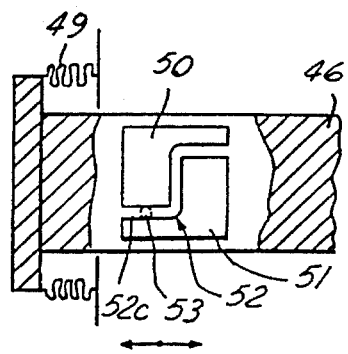

FIGS. 14 to 16 illustrate the application of a coupling similar to that of FIGS. 12 and 13 in the control, the principle of which was explained with reference to FIG. 10, of an internal combustion engine supercharged by at least one turbocompressor. For this purpose, it is sufficient to cause said supercharging pressure $P_2$ to act in the bellows 49. In addition, it is of interest to give the rib 52 not a helical shape as represented in FIG. 13 but a stepped shape, with two end parts 52a and 52c substantially parallel to the axis of translation of the slide 46 and a central part 52b contained in a plane perpendicular to said axis.

The operation is then as follows. In a first stage illustrated in FIG. 14, the orifice 53 is placed in facing relation to the part 52a of the rib 52. The phase difference is set at its maximum value, irrespective of the supercharging pressure, so long as the latter is below a certain threshold (setting in position).

In a second stage illustrated in FIG. 15, the orifice 53 is placed in facing relation to the part 52b of the rib 52. If the supercharging pressure increases, the phase difference decreases and inversely (control by pressure). The phase difference between the driving shaft (crankshaft of the engine) and the driven shaft (camshaft) is automatically adjusted so that the supercharging pressure assumes the value corresponding to the obturation of the orifice 53. As the part 52b is substantially perpendicular to the displacement of the slide 46, the supercharging pressure will be maintained constant.

In a third stage illustrated in FIG. 16, the supercharging pressure exceeds the predetermined threshold owing to the load of the engine. The phase difference reaches the minimum value and remains set at this minimum value irrespective of the value of the supercharging pressure (provided it remains higher than said threshold), owing to the face that the part 52c of the rib 52 is substantially parallel to the displacement of the slide 46. In this way a physical contact is avoided between the vane 17 and the rib 12 (instead there is a fluid stop), which mechanically preserves the parts and limits the noise.

Figure 17:
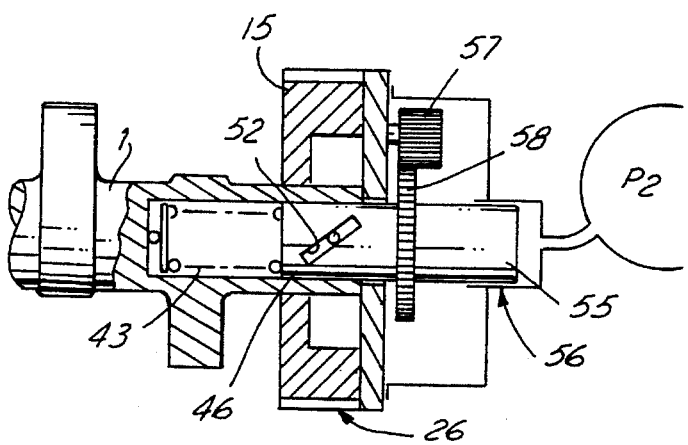
FIGS. 17 and 18 finally illustrate another variant of the foregoing embodiments
Figure 18:
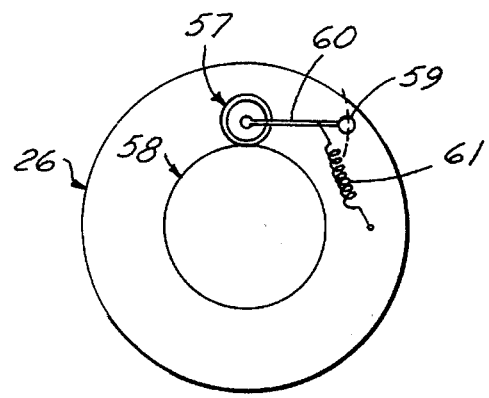

In the foregoing, couplings were described with reference to FIGS. 10, 12 and 13 in which the position of the distributing slide 23 is controlled as a parameter of operation of the engine by the supercharging air pressure $P_2$. As is clear from the foregoing, this position could also be controlled by the speed of the engine and possible in addition by this supercharging pressure. This will be explained with reference to FIGS. 17 and 18.

The slide 46 has an axial position determined by a piston 55 connected to the slide 46 and slidable in a cylinder 56. The cylinder 56 is connected to the driving gear pinion 26 and cooperates, under the effect of the supercharging pressure $P_2$, with a spring 43. The angular position of the slide 46 is determined by a gear pinion 57 connected to the driving pinion 26 and in mesh with a gear pinion 58 connected to the slide 46. The connecting pinion 57 connected to the driving pinion 26 may vary in its angular position relative to the driving pinion 26 owing to the provision of an eccentric weight 59 cooperating with the shaft of the connecting pinion 57 through a lever arm 60 retained by a spring 61.

Thus a value of the angular position of the slide 36 will correspond to each value of the speed of the driving shaft (and therefore of the engine), while an axial position of the slide 46 will correspond to each value of the supercharging pressure. There is in this way achieved the double control of the phase between the driving pinion and the driven pinion (camshaft) by the speed of rotation of the engine and the supercharging pressure $P_2$.

From the foregoing description and the accompanying drawings referenced therein it now will be readily apparent to one of ordinary skill in the art that the present invention amply fulfills the aforestated objects as incorporated in the various embodiments as previously described and illustrated. The variable phase shift drive coupling embodiments of the invention, in transmitting driving torque therethrough, are intended for use in, and take advantage of, the driving and driven parts being subjected in operation to alternating resistant and driving torques so that it is possible to vary in operation the phase between the driving shaft and the normally driven shaft without the use of a power means for operating the phase shift function of the coupling, such as a source of fluid under pressure from a high pressure hydraulic pump. The various previously described coupling embodiments of the invention offer the advantages of rendering these couplings simpler, more compact, less costly and more reliable. These couplings are capable of operating to provide a rapid phase shift between the driving shaft and the driven shaft. It will also be seen, particularly with reference to the rotary vane embodiment of FIGS. 12 and 13 that the phase shift coupling of the invention can be arranged in such a manner as to allow a large angular difference between the driving shaft and the driven shaft without resulting in angular vibrations. In this rotary vane embodiment this is accomplished with a built-in hydraulic and mechanical feedback system with a hydraulic closed loop control for resetting and stabilizing the phase shift angle between the camshaft and crankshaft.

By way of further explanation, and referring again to FIGS. 12 and 13, it will be seen that rib 52 functions as a valve member controlling the fluid flow in the associated valve-controlled passageway 53 as a function of phase shift between camshaft 1 and the gear pinion 26 connected to the driving shaft (engine crankshaft). This is primarily caused by controlled fluid flow from the hydraulic control chambers 13 and/or 14 through the action of the unidirectional communication and distribution control means in response to torque reversals as described previously, but also tends to occur in an uncontrolled manner through a leakage path or by expansion and contraction of the hydraulic fluid in these chambers relative to one another. It will be recalled that valve rib 52 and the fluid passageway 53 controlled thereby are also mechanically linked to their respective relatively movable drive train parts in order to mechanically sense phase shift. This internal closed loop hydraulic feedback control thus renders the coupling of the invention rapidly and accurately re-settable to a desired phase shift in response to controlled actuation, as well as inherently stable against phase shifts otherwise caused by leakage and/or hydraulic fluid compressibility.

In the embodiment of FIGS. 12 and 13, spool valve 46 carrying rib 52 is compactly arranged internally of the mechanism so as to be axially movable inside one of the two shafts and is angularly directly linked to the other of the two shafts for movement in unison therewith. These features of the invention thus obviate the need for an external loop control of the phase shift coupling and hence eliminate the need for external phase measurements between the driving and driven parts, associated sensors, microprocessors and actuators as well as the electronic and other mechanical components hitherto required when utilizing such known external loop control systems. Instead, with the closed loop internal ("built-in") hydraulic feedback control of the invention, programming can be accomplished merely by varying the shape of valve rib 52 so that it can be responsive to any engine running parameter, such as the boost pressure and/or engine speed as described previously. The spool valve 46 with its shaped valve rib 52 can also be linked to any external conventional "programmer", whether it be of any known hydraulic, mechanical, electrical or electronic type.

Figure 19:
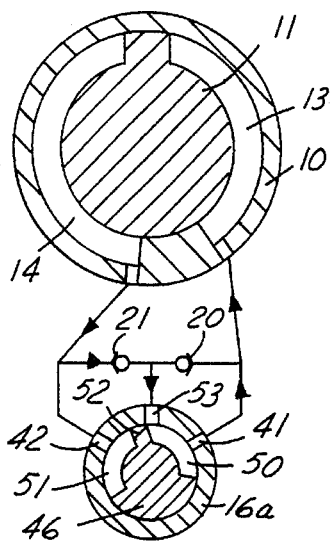
FIGS. 19, 20 and 21 are simplified diagrammatic views illustrating with a three position sequence the operation of the built-in hydraulic feedback loop control of the phase shift angle between the camshaft and crankshaft angular positions of the coupling embodiment illustrated in FIGS. 12 and 13, with the rotary cylinder and rotary vane piston shown by themselves in the upper view of these figures, and the directional communication circuit and distributing means in shaft 16 containing the rotatable and slidable slide 46 shown separately in the lower view of these figures to thereby facilitate further explanation.
Figure 20:
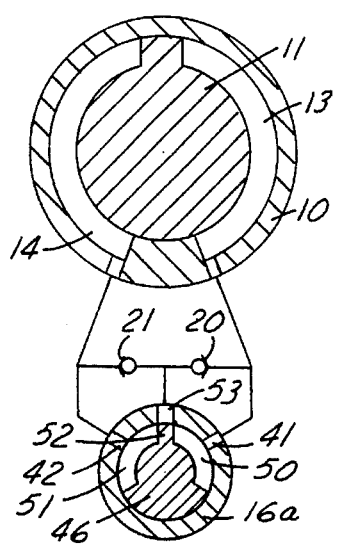
Figure 21:
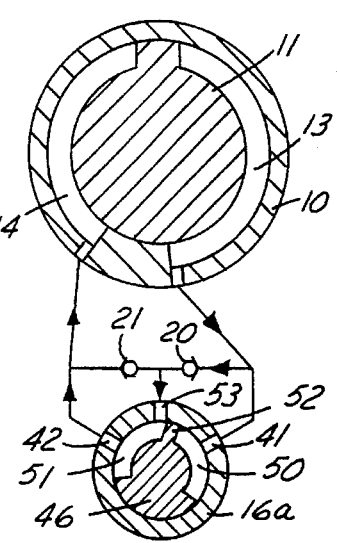

The operation of the built-in hydraulic feedback control system feature of the invention can perhaps be better visualized by reference to the simplified diagrammatic split views of FIGS. 19, 20 and 21, taken in conjunction with the previous description and drawing illustrations relative to the embodiments of FIGS. 3 and FIGS. 12 and 13. In the views of FIGS. 19–21, the unidirectional communications circuits and associated check valves 20 and 21 are illustrated schematically for functioning as described previously. Note as seen in FIG. 20, the rotative spool valve of the device comprises rotative piston 46 that is directly mechanically linked to rotate in unison with cylinder 10 which is driven by the engine crankshaft, and the rotative cylinder 16a is directly mechanically linked to the camshaft 1 for rotation in unison therewith. Spool valve piston 46 is provided with the valve rib 52 which separates the two recesses 50 and 51 formed on spool 46 to define the flow passages between the inner diameter of the rotative cylinder 16a and the outer diameter of the rotative piston 46.

The flow controlling passageway 53, which is drilled through the wall of the rotative cylinder 16a, thus has a port which communicates alternately with chambers 50 and 51 under the control of the valve rib 52 which has a transverse width at least equal to the width (diameter) of the rib-controlled port of passageway 53. Passageway 53 is connected via the two one-way conduits 20 and 21 to the two oppositely active cavities 13 and 14 (antagonistic chambers) under the control of the one way check valves 21 and 20. These two working cavities 13 and 14 are also connected to the two spool valve recess chambers 50 and 51 via the always open conduits 41 and 42 respectively. Thus, as seen in FIG. 20 valve rib 52 is completely obstructing the control orifice 53 and hence there is no possibility of direct hydraulic fluid passage between working cavities 13 and 14, except for the possibility of leakage of hydraulic fluid (e.g., engine lubricating oil) therebetween, if any. The phase angle between cylinder 10 (rotationally linked to the crankshaft), and the rotative cylinder 16a, which is directly rotationally mechanically connected to rotary piston 11 and its vane 17 and to the camshaft 1, is thus hydraulically locked so that camshaft 1 and its cam 2 rotate at the same speed as the engine crankshaft and at a given desired phase angle therebetween.

Referring to FIG. 19, a condition is illustrated in which it is assumed that some oil leakage has occurred from cavity 13 to cavity 14, having thereby caused some undesirable or uncontrolled phase shift between the driving and driven shafts. This leakage induced phase shift has thus uncovered orifice 53 (shown completely uncovered but normally only partially so under such leakage conditions), thereby opening a direct one-way fluid flow passage from chamber cavity 14 via check valve 21, passageway 53, recess chamber 50 and passageway 41 back to working chamber 13, with reverse flow in this passageway system being blocked by check valve 21 and bypasss flow blocked by check valve 20. This will cause the rotative piston 46 and its valve rib 52 to rotate back clockwise as viewed in FIG. 19 relative to the rotative cylinder 16a until orifice 53 once again becomes completely obstructed by valve rib 52, thereby restoring the originally controllably set phase angle between the driving and driven shafts. Hence with this built-in closed loop device the system is inherently stable.

FIG. 21 diagrammaticaly shows the symmetrical situation when, for example, leakage from chamber 14 to chamber 13 has caused the camshaft position relative to the crankshaft position to vary in the sense of an oppositely changing phase angle therebetween. This condition thus opens communication via the path of check valve 20, passageway 53, chamber 51 and passageway 42 from working chamber 13 to working chamber 14. This in turn will cause rotative piston 46 and its valve rib 52 to rotate back in the opposite sense, i.e., counterclockwise relative to rotative cylinder 16a until orifice 53 once again becomes completely obstructed by valve rib 52.

It, of course, will also be seen that the closed loop feedback system internally built-in to the phase shift coupling of the invention automatically effects closed loop control of the desired phase shift between the driving and driven parts. Thus when piston 46 is moved axially a given amount under the influence of an external control, such as by the change in pressure communicated to bellows 49 (FIG. 13) to impart a given phase shift between the driving and driven parts, this distributor and its associated unidirectional circuits will cause relative rotation between the parts in response to sequential torque reversals until this desired phase shift has occurred, at which point rib 52 will completely obstruct passageway 53 to accurately cease such relative rotation when the desired given amount of phase shift has occurred. Thus the spool valve, which is shifted to open and close communication between the working chambers 13 and 14 of the coupling to cause a desired phase shift between driving and driven shafts to a given desired re-set phase angle, also functions to provide a closed loop feedback control which automatically locks the driving and driven shafts when this desired phase shift has occurred, and then further functions to stabilize and hold this desired re-set phase angle between the driving and driven parts against the destabilizing influence of the compressibility of the hydraulic fluid and/or leakages between chambers 13 and 14.

Referring to FIG. 22, it now will be seen that application of the previously described closed loop built-in internal feedback system feature of the invention is directly applicable to the reciprocating-piston-type phase shift coupling embodiment of FIG. 7. This, instead of being external, the control spool valve 23 of the system of FIG. 7 is built-in to the end of piston rod 29 protruding from the left hand side of cylinder case 31. Thus the piston rod 29 is provided with an extension 46' which is configured in the manner of the spool valve 46 of FIG. 13 to have the control valve rib 52 flanked by the recesses 50 and 51 to define the chambers between the outer periphery of spool portion 46' and a surrounding spool valve sleeve or casing 23'. Casing 23' contains the valve-controlled passageway 53 connected to the unidirectional distribution circuits, i.e., check valve 20 communicating via line 18 with chamber 32 of cylinder 31, and check valve 21 and line 19 communicating with chamber 33 of cylinder 31. Chamber 50 of the spool valve is in always-open communication with cylinder chamber 32 via a drilled passage 41' in rod 29, and likewise chamber 51 is in always-open communication with cylinder chamber 33 via a drilled passage 42' in rod 29. The rotative piston rod 29 and its extension 46' are directly coupled to the piston 30 and rotationally linked to camshaft 1 via the external shaft portion 29 and the straight spline teeth 34/35 so that these parts rotate in unison. Similarly, the rotative spool sleeve 23' is directly coupled via bellows 49 with cylinder 31 which is directly rotationally linked to the crankshaft via driving pinion 26 so that these associated parts rotate in unison.

Thus as in the coupling of FIG. 7, spool valve 46' and rod 29 can move axially in response to reciprocation of piston 30 in cylinder 31 under the action of the hydraulic fluid admitted to the opposed chambers 32 and 33. The desired phase shift in the coupling can be imparted by an engine parameter changing the pressure in bellows 49 to thereby shift spool sleeve 23' axially relative to cylinder 31 while rotating therewith, and likewise axially relative to rod portion 46' which serves as the cooperative portion of this form of phase shifting spool valve. The reciprocating piston 30 as it moves axially relative to pinion 26 has the desired phase shift angle imparted by the action of the cooperating helical teeth 27 and 28 of pinion 26 and rod 29 respectively, as before in FIG. 7. This translates axial or translational motion between piston 30 and cylinder 31 (and hence gear 26) and into angular phase shift relative rotational motion between driving pinion 26 and camshaft 1. Valve rib 52, control passageway 53 and chambers 50 and 51 with their associated passageways 41' and 42' function exactly like the system of FIGS. 12 and 13, as further explained in conjunction with FIGS. 19–21, to thereby provide internal built-in closed loop feedback control of the desired angular phase shift between the driving and driven parts, as well as automatic stabilizing action against undesired incremental motion of piston 30 relative to casing 31 as in the system of FIGS. 12 and 13.

FIG. 23 diagrammatically illustrates application of the foregoing principles of the phase shift coupling of the invention to variable cam timing (VCT) systems or other analogous drive train systems for the transmission of an alternating torque between a driving part, intended to be connected to a driving shaft, and a driven part, intended to be connected to a shaft which is normally driven, and wherein these parts are subjected in operation to alternating resistant and driving torques. In the embodiment of FIG. 23 the piston and cylinder, as in the embodiment of FIG. 7 have a reciprocating (i.e., linear) stroke motion and move axially relative to one another as an alternative to the rotary vane type piston and cylinder arrangements of the embodiments of FIGS. 3, 9, 10, 12 and 13 in which relative motion is oscillatory rather than reciprocating.

Thus, in the embodiment of FIG. 23 (wherein parts alike to those previously described are given the same reference numeral raised by a prime suffix) the driving gear again consists of a pinion gear 26' having internal helical teeth 27' threadably in mesh with mating helical teeth 28' provided on a piston rod 29'. Piston rod 29' is of uniform diameter throughout its axial length and is slidably supported at its opposite ends in axially opposed blind bore cylinders 31a and 31b such that its axially opposed end faces 29a and 29b form working surfaces which cooperate with cylinders 31a and 31b respectively to define, as before, two antagonistic or opposed working chambers 13' and 14' respectively. Again, chambers 13' and 14' have a substantially constant total volume and are filled with a hydraulic liquid (e.g., engine lubricating oil) which is practically incompressible at the normal operating pressures of the system.

Also, as before, chambers 13' and 14' are interconnected by two unidirectional communication circuits having opposite flow directions and each having a substantially constant volume, and associated distributing means arranged in such manner as to either bring into action either of these communication circuits while neutralizing the other, or neutralizing both of them, depending on whether the phase difference between the driving and driven parts of the coupling must be either increased or decreased, or maintained constant. Thus a modified spool valve 23' is provided as so to be axially slidable in a suitable supporting body (not shown), and is provided with two spaced through-passages in which opposite axial check valves 20' and 21' are respectively operably disposed for cooperation with the unidirectional communication circuits 18' and 19' communicating respectively with chambers 13' and 14'. These spool valve passages' containing check valves 20' and 21' are thus capable of insuring alternating continuity of the circuits 18' and 19', and the portion of spool 23' therebetween has a full bearing, flow-blocking surface for interrupting these same circuits. The system of FIG. 23 thus provides open loop control of phase shift in the manner of the embodiment of FIG. 3.

The embodiment of FIG. 23 also illustrates another variation of the principles of the invention in that, instead of piston rod 29' being directly mechanically linked by straight splines with camshaft 1 to drive the engine valve operating cam 2 as in FIG. 7, the coupling is mounted off the camshaft on supports 70 and 72 which may be suitably stationarily and rigidly interconnected with the engine block (not shown) to provide the coupling support and working chamber cylinders 31a and 3lb. Piston rod 29' is then indirectly drivingly linked to camshaft 1 for rotation in unison therewith by a suitable belt or chain drive (not shown) drivingly trained around a driven pinion gear 74, in turn drivingly mounted on piston rod 29' and having internal helical gear teeth 76 threadably meshed with mating helical gear teeth 78 provided on piston rod 29'. Gear teeth 76, 78 are preferably of equal pitch and lead angle to those of gear teeth 27', 28' but have a symmetrically opposite helical angle relative thereto (i.e., complimentary right and left hand threaded mounting respectively). Gears 26' and 74 are held against axial movement relative to support 70 and 72 by associated flanking collars 80, 82, 84 and 86 suitably stationarily supported relative to support 70 and 72.

Thus, as in the embodiment of FIG. 7, axial reciprocation of piston rod 29' relative to pinions 26' and 74' causes angularly opposite rotation of these gears relative to rod 29' to impart the desired angular phase shift in the drive train through the coupling. However this movement of coupling piston 29' in translation (as distinguished from the rotary or oscillatory motion of the rotary vane piston embodiment) imparts twice the amount of angular phase shift as that produced in the embodiment of FIG. 7 due to the equal and opposite helical gear coupling of pinions 26' and 74' with piston rod 29' for the same increment of axial movement of piston rod 29' versus piston rod 29. Again, due to the indirect coupling via chains or belts between the engine crankshaft and pinion 26', on the one hand, and the engine valve camshaft 1 to pinion 74 on the other hand, the pinions and hence piston rod 29' are subjected in operation to alternating resistant and driving torques. This creates the aforementioned differences in the pressure of the hydraulic liquid in the opposed working chambers 13' and 14' of this phase shift coupling for increasing the volume of one or the other of these chambers and correlatively decreasing the volume of the opposite chamber, under the control of the joint action of the unidirectional communication circuits and distribution means 22' to thereby vary the phase difference in the desired sense by an exchange of hydraulic liquid between these two chambers.

FIG. 24 illustrates another embodiment of a variable phase shift coupling in accordance with the principles of the invention utilizing the oppositely threaded driving gear pinion 26' and driven pinion gear 74 of the embodiment of FIG. 23 held axially relative to a stationary support structure 96 by the associated collars 80-86 and driving linked for rotation with and by a modified piston rod 90 by the respectively associated engaged helical teeth 27', 28 and 76, 78. Piston rod 90 carries fixed thereon a cylindrical piston 92 adapted to reciprocate in a cylinder 94 of stationary support structure 96 which is suitably affixed to the engine block. Cylinder 94 is closed at its opposite ends by end cap plates 98 and 100 affixed to support 96 and carrying suitable liquid tight seals through which slides the outer cylindrical periphery of rod 90. Piston 92, cylinder 94 and end plates 98 and 100 thus define two opposed or antagonistic working chambers 32' and 33' which together have a substantially constant total volume and which are filled with a liquid (e.g., engine lubricating oil) which is practically incompressible at the normal pressures of operation of the coupling. Hence the embodiment of FIG. 24 has a single pair of antagonistic chambers similar to the embodiments of FIGS. 3 and 7.

In the embodiment of FIG. 24 piston rod 90 is made hollow and slidably receives centrally and coaxially therethrough a spool valve 102 somewhat similar to spool valve 46 of the embodiments of FIGS. 12, 13 and FIG. 22. Spool 102 is directly linked for rotation in unison with pinion 74 by a coupling cap 104 suitably affixed to pinion 74 and having a sliding key connection with a spline groove 106 of spool 102.

In the embodiment of FIG. 24, as in the embodiment of FIGS. 12 and 13, the unidirectional communication circuits and associated distributing means are built-in, i.e., provided on spool valve 102 and within piston 92 to provide the corresponding closed loop phase shift control and leakage stabilizing action described previously in conjunction with FIGS. 12, 13 and 19–21. Thus spool valve 102 has the corresponding valve rib 52' and associated flanking recesses 50' and 51' in respective always-open communication with working chambers 32' and 33' via passages 41' and 42' respectively. Valve rib 52' controls flow communication through a passage 53' of piston 92 under the control of the directionally oppositely acting check valves 20' and 21' of the unidirectional communication circuits provided in piston 92 to thereby control communication between chambers 32' and 33', each of these circuits likewise having the aforementioned substantially constant volume. It thus will be seen that the embodiment of FIG. 24 provides a phase shift coupling in accordance with the invention for indirect driving coupling between the engine crankshaft and engine camshaft with an off-camshaft-mount, and with dual right and left hand threaded pinions as in the embodiment of FIG. 23, while also incorporating the built-in hydraulic feedback with a closed loop control of phase shift and leakage stabilization of the embodiment of FIGS. 12 and 13. It thus operates in the manner previously described in conjunction with these embodiments.

In accordance with another important feature of the variable phase shift coupling of the present invention, as described previously in conjunction with the embodiment of FIG. 9, it is preferred to arrange the coupling to have at least two pairs of chambers opposed in pairs, i.e., the pair of chambers 13a and 13b on the one hand, and the pair of chambers 14a and 14b on the other with such chambers equally angularly spaced about the chamber defined by cylinder 10 as delimited by the diametrically opposed cylinder wall abutments 12a and 12b between which the diametrically opposed rotary vanes 17a and 17b oscillate in operation. These chambers 13a, 14a, 13b and 14b thus alternate circumferentially on the internal circumference of the cylinder 10. Also as noted previously, the opposed chamber pair 13a and 13b are constantly interconnected by the always-open through passage 47, and likewise the two chambers 14a and 14b are constantly interconnected through always-open passage 48, passageways 47 and 48 thereby serving as passive parallel communication circuits between the paired chambers. The unidirectional communication circuits and distribution means represented by the oppositely acting unidirectional check valve 39 and 40 of FIG. 9 communicate with chambers 13b and 14a as shown, and also indirectly and passively with the respectively associated chambers 13a and 14b through passages 47 and 48 respectively.

Thus it will be seen that each opposite face or working surface of the two piston vanes 17a and 17b of the rotary piston are interconnected "two-by-two" via the passive parallel communication passage of 47 and 48. Consequently the active working surface areas of the vanes exposed to the pressure of the working fluid in the associated working chambers 13a, 13b, 14a and 14b are multiplied by two. Therefore, for a given level of torque reversals, the pressure levels inside the cavities 13a (and 13b) and 14a (and 14b) are divided by two.

Although, as pointed out previously, this multiplication of the working vanes at equal angular increments in the cylinder 10 (two vanes 17a and 17b instead of the one vane 17 of FIG. 3; or even three or four equally angularly spaced vanes with associated fixed abutments corresponding to abutments 12a and 12b) has the drawback of a corresponding reduction by one half (or more if more than two vanes) of the angular movement of piston 11 relative to cylinder 10, this multiplication of vanes and subdivision of the working chambers has many offsetting and important advantages, including the aforementioned advantage of balancing the forces acting on elements 10 and 11 in operation (i.e., dynamically and statically). In addition, this arrangement provides the further advantages of reduction of stress levels (and corresponding strains) in the piston and cylinder structure of the coupling due to the corresponding reduction (50% in the case of the paired vanes 17a and 17b and associated paired chambers 13a–13b; 14a–14b of FIG. 9) in the fluid pressure differences created between the associated working cavities in the operation of the coupling. This pressure reduction also leads to a corresponding reduction in the amount of oil leakage between these cavities, and likewise a reduction of the phase oscillation between the associated driving and driven shafts.

The application of this feature of providing multiple pairs of antagonistic chambers which are permanently fluid intercommunicated by associated always-open passive parallel communication circuits may likewise be applied to reciprocating piston and cylinder arrangements, as distinguished from rotary vane piston and cylinder, oscillatory arrangements, as illustrated by way of example in the embodiment of FIG. 25. In this embodiment the corresponding elements of the embodiment of FIG. 23 are utilized and given like reference numerals and the description not repeated. The only modification necessary to accomplish application of this feature is the provision of an additional, larger diameter cylindrical piston member 110 on piston rod 29' which slidably sealably reciprocates in a larger diameter cylinder 112 provided in support 70 and closed at its axially opposite ends by walls 114 and 116. It thus will be seen that the single pair of opposed chambers 13' and 14' of FIG. 23 remain as a like pair of opposed chambers 13a' and 13b', and another pair of opposed chambers 14a' and 14b' are added. Piston rod 29 is provided with always-open passive parallel communication passage 47' interconnecting chambers 13a' and 13b' and similar always-open passageway 48' interconnecting chambers 14a' and 14b' in the manner of the rotary vane piston embodiment of FIG. 9.

The coupling embodiment of FIG. 25 thus operates in the manner of the reciprocating piston embodiment of FIG. 23 as so modified to have the two pairs of antagonistic working chambers of the embodiment of FIG. 9, to thereby provide the aforementioned corresponding advantages of multiplication of the active surfaces of the opposed piston working faces of 29a and 29b by the provision of the additional working faces of secondary piston 110 acting in between the additional opposed chambers 13b' and 14b'. Again, the pressure levels within the cavities 13a', 13b', 14a' and 14b' are thus divided in half, while retaining the characteristic common feature of interconnection by two unidirectional communication circuits having opposite working directions and each having a substantially constant volume, and with the paired working chambers having a substantially constant total volume, as in all of the previously described embodiments of the invention.

What is claimed is:

1. A variable phase coupling for transmission of an alternating torque between a driving part which is connected to a driving shaft and a driven part which is connected to a normally driven shaft where the parts in operation are subjected to alternating resistant and driving torques comprising:

a cylinder means to which one of the driven and driving parts is connected;

a piston means to which the other one of the driven and driving parts is connected and which is disposed relative to said cylinder means such that at least two antagonistic chamber means are provided in said cylinder means and such that a relative and single position between said piston means and said cylinder means corresponds to an angular phase difference value between the shafts, said chamber means having a substantially constant total volume and being filled with a hydraulic liquid which is practically incompressible at normal pressures of operation of the coupling;

two communications circuit means of substantially constant volume which interconnect said chamber means and which allow fluid communication between said chamber means only in respective opposite directions; and a distributing means for bringing into fluid communication said chamber means through one or the other of said communication circuit means while preventing fluid communication through the other of said communication circuit means and for blocking fluid communication between said chamber means, selectively, such that the phase difference between the driving and driven parts is selectively increased, decreased, or maintained constant;

and wherein said cylinder means and said piston means are constructed and arranged to undergo relative movements of rotation;

said cylinder means including a cylindrical case, respective transverse walls which axially limit said cylindrical case, and at least two radial partitions;

said piston means including a shaft which extends through said transverse walls in a sealed manner and at least two radial vanes extending radially from said shaft such that said radial vanes define at least two pairs of said antagonistic chamber means which alternate in a circumferential direction about said shaft, each said pair of said antagonistic chamber means comprising a first chamber and a second chamber separated from one another by an associated one of said two vanes, said first and second chambers of one of said pairs of antagonistic chamber means being arranged in alternating relationship circumferentially of said cylindrical case respectively with said first and second chambers of the other of said pair of antagonistic chamber means;

and wherein said distributing means permanently interconnects said chamber means in pairs and includes an always open first passageway communicating fluid between said first chambers and an always open second passageway communicating fluid between said second chambers.

2. A variable phase rotary coupling for transmission of an alternating torque between a driving part which is connected to a driving shaft and a driven part which is connected to a normally driven shaft where the parts in operation are subjected to alternating resistant and driving torques relative to a rotational axis of said coupling comprising;

a plurality of cylinders to which one of the driven and driving parts is connected;

a plurality of pistons to which the other one of the driven and driving parts is connected and which are individually disposed in and relative to said cylinders such that first and second antagonistic chambers are provided in each said cylinder by an associated one of said pistons and such that a relative and single position between each said piston and each said cylinder corresponds to an angular phase difference value between said shafts, said first and second chambers of each said cylinder having a substantially constant total volume and being filled with a hydraulic liquid which is practically incompressible at normal pressures of operation of the coupling;

two phase controlling communication circuits of substantially constant volume which interconnect said antagonistic chambers of each said cylinder and which allow fluid communication between said first and second chambers of each said cylinder only in respective opposite directions;

two passive parallel fluid connection circuits comprising respectively always open first and second passageways respectively communicating fluid constantly between all of said first chambers and between all of said second chambers to thereby reduce the magnitude of the variations of pressure of the fluid in each of said chambers as a function of the number of said plurality of cylinders and associated pistons; and a distributing means for bringing into fluid communication said chambers of each said cylinder through one or the other of said communication circuits while preventing fluid communication through the other of said communication circuits and for blocking fluid communication between said chambers of each said cylinder, selectively, such that the phase difference between the driving and driven parts is selectively increased, decreased, or maintained constant.

3. A variable phase coupling as claimed in claim 2 wherein said pistons and cylinders are disposed in a circumferentially spaced array about said axis of rotation of said coupling and are oriented to provide a statically and dynamically balanced system about said coupling rotational axis.

4. A variable phase coupling as claimed in claim 3 wherein said antagonistic first and second chambers of said cylinders are oriented to alternate relative to one another in a circular direction concentric with said coupling rotational axis and said pistons each comprise a rotary vane oscillatable in the associated one of said cylinders.

5. In an internal combustion engine having a crankshaft, at least one camshaft, the at least one camshaft being position variable relative to the crankshaft and being subject to torque reversals, the method comprising:

providing first and second hydraulic cylinders operable by hydraulic fluid therein operably interconnected for varying the position of the at least one camshaft, providing first and second piston members respectively movable in said first and second cylinder and respectively subdividing each of said first and second cylinders into first and second oppositely acting cylinder subchambers complementary in volume to each other as determined by the position of each said piston member in the associated said cylinder, permanently operably mechanically interconnecting said piston members to operate in use in unison to transmit forces exerted by the hydraulic fluid on said piston members, and vice versa;

varying the position of the at least one camshaft relative to the crankshaft by transferring hydraulic fluid from each one of the first and second hydraulic cylinder subchambers to each of the other of the first and second hydraulic cylinder subchambers;

continuously hydraulically interconnecting said first subchambers with one another and continuously hydraulically interconnecting said second subchambers with one another; and actuating the first and second hydraulic cylinders for varying the position of the at least one camshaft relative to the crankshaft in reaction to torque reversals in the at least one camshaft.

6. An internal combustion engine comprising:

a crankshaft, said crankshaft being rotatable about an axis;

a camshaft, said camshaft being rotatable about a second axis, said camshaft being subject to torque reversals during the rotation thereof;

a vane having first and second circumferentially spaced apart lobes, said vane being attached to said camshaft, being rotatable with said camshaft and being non-oscillatable with respect to said camshaft;

a housing, said housing being rotatable with said camshaft and being oscillatable with respect to said camshaft, said housing having first and second circumferentially spaced apart recesses, each of said first and second recesses receiving one of said first and second lobes, and permitting oscillating movement of said one of said first and second lobes therein;

rotary movement transmitting means for transmitting rotary movement from the crankshaft to the housing; and means reactive to torque reversals in the camshaft for varying the position of the housing relative to the camshaft comprising control means for permitting the housing to move in a first direction relative to the camshaft in reaction to a torque pulse in the camshaft in a first direction and for preventing the housing from moving in a second direction relative to the camshaft in reaction to a torque pulse in the camshaft in a second direction, each of said first and second lobes respectively dividing each of said first and second recesses into a first portion and a second portion each being capable of sustaining hydraulic pressure, said first and second portions of said first and second recesses alternating circumferentially of said housing, and wherein said control means comprises means for transferring hydraulic fluid out from one of said first portion and said second portion of each of said first and second recesses and into the other of said first portion and second portion of said each of said first and second recesses, and wherein said control means is capable of being reversed to transfer hydraulic fluid from out of said other of said first portion and said second portion of said each of said first and second recesses and into said one of said first portion and said second portion of said each of said first and second recesses, said engine further comprising an engine control unit responsive to at least one engine operating condition for selectively reversing the operation of said control means, and always open first and second passage means respectively communicating fluid between all of said recess first portions and all of said recess second portions to thereby reduce the magnitude of the variations of pressure of the fluid in each of said recesses as a function of the number of recesses and associated lobes.

7. A variable phase coupling for transmission of alternating torque between a driving part which is connected to a driving shaft and a driven part which is connected to a normally driven shaft where the parts in operation are subjected to alternating resistant and driving torques comprising:

a first coupling member rotatably coupled to the one of said parts for adjusting the phasing of said shafts relative to one another;

a second coupling member rotatably coupled to the other one of said parts;

hydraulic cylinder means operably connected to said first coupling member;

piston means in said hydraulic cylinder means and thereby forming first and second antagonistic hydraulic chambers adapted to be filled with a fluid, said piston means being operably connected to said second coupling member;

hydraulic passageway means communicating between said hydraulic chambers and incorporating normally closed first and second hydraulic check valves;

said check valves being oppositely directed relative to one another wherein (i) when the first check valve is open, fluid can flow in a first one direction only from said first chamber to said second chamber and will be precluded from flowing in a second opposite direction, and (ii) when the second check valve is open, fluid can flow in the second direction only from said second chamber to said first chamber and will be precluded from flowing in the opposite first direction, and (iii) when both check valves are closed, no flow between said chambers is possible and the rotation of said first coupling member is transmitted through said piston and fluid trapped in said chambers to said second coupling member so that both said coupling members are hydraulically locked to rotate with the same angular velocity at some give angular phase relationship therebetween;

fluid flow control means operatively coupled to each of said two check valves to selectively cause opening of either one of said check valves while causing the other of said check valves to remain closed, said fluid flow control means normally being rotatively operable coupled to said coupling members to rotate with the same angular velocity as said coupling members and occupying a relative position in which both said first and second check valves are closed;

phase shift control means operably coupled to said fluid flow control means for position phase shifting said fluid flow control means relative to said first coupling member such that said fluid flow control means is phase shiftable relative to said coupling members to produce a temporary phase shift between said coupling members by causing the opening of a preselected one of said check valves, depending upon the preselected direction of the phase shift, and thereby allowing fluid flow from one of said chambers to the other of said chambers and causing said second coupling member to phase shift relative to said first coupling member and relative to said fluid flow control means in the same direction as said fluid flow control means was phase shifted, said phase shift of said second coupling member continuing until the original relative position of said second coupling member and said fluid flow control means is restored to thereby provide a closed loop position feedback mode of operation to accurately control the amount of phase shift thereby produced between said coupling members and to thereby also inherently self-compensate for fluid leakage between said hydraulic chambers.

8. A coupling as claimed in claim 7 wherein said cylinder and said piston undergo relative movements in translation, and further including a mechanical means for converting these translational movements into relative movements of rotation of said coupling member.

9. A coupling as claimed in claim 7 wherein said phase shift control means comprises a hollow cylinder; and wherein said hydraulic passageway means includes a common portion having a common first orifice which opens to the hollow of said cylinder; and wherein said fluid flow control means includes a fluid flow control movable element, a rotating means for mounting said movable element for rotation in the hollow of said cylinder about the axis thereof, two external recesses circumferentially spaced apart on said movable element, and a rib on said movable element which separates said recesses into spaces to form first and second rotary valve chambers circumferentially spaced apart from one another in said cylinder and fluid flow isolated from one another by said rib;

and wherein said cylinder further includes respective second and third orifices located on respective angular offset sides of said common first orifice in the direction of rotation of said movable element and which respectively connect said first and second antagonistic hydraulic chambers to said first and second rotary valve chambers, said rib being operable as a rotary valve element by having an end face with a dimension circumferentially of said cylinder sufficient to close flow between said common orifice and both of said rotary valve chambers when said cylinder and movable element are oriented in said relative position in which both of said check valves are closed, movement of said rib with said movable element in either direction away from said relative position thereby opening said common first orifice and allowing flow of the fluid respectively to either of said first and second rotary valve chambers for causing said temporary phase shift between said coupling members in either direction whereby the occurrence of such phase relatively rotates said cylinder and movable element to return said rib to closed position at said common orifice to thereby effect said closed loop position feedback mode of operation.

10. A coupling as claimed in claim 9 in combination with an internal combustion engine having a crankshaft constituting said driving shaft and at least one camshaft constituting said driven shaft, wherein the camshaft is subject to torque reversals associated with opening and closing of the valves during engine operation, and wherein a preselected parameter of operation of said engine is dependent on said phase difference and said rib is shaped to cause the closed loop feedback control of said phase shifting means to maintain said parameter of operation of the engine in an operating range of the engine.

11. An internal combustion engine as claimed in claim 10 wherein said rib has a generally helical shape.

12. An internal combustion engine as claimed in claim 10 wherein said rib has a generally stepped shade.

13. An internal combustion engine as claimed in claim 10 wherein said hydraulic cylinder means and said piston means undergo relative movements of rotation, and wherein said hydraulic cylinder means includes a cylindrical case, respective transverse walls which axially limit said cylindrical case, and at least one radial partition to thereby define with said case and walls a fluid cavity; and wherein said piston means includes a hollow shaft defining said hollow cylinder and which extends through said transverse walls in a sealed manner and a radial vane extending radially outwardly from said hollow shaft into said fluid cavity to thereby separate the same into said first and second antagonistic hydraulic chambers, the interior of said hollow shaft receivably mounting said phase shift control movable element for relative rotation therein, said hydraulic passageway means being disposed in said radial vane and said common orifice thereof opening to the hollow of said shaft for communication with said first and second rotary valve chambers when registered therewith by movement of said rib relative to said shaft.

14. An internal combustion engine as set forth in claim 13 wherein said hydraulic cylinder has a second radial partition to thereby define with said case and walls a second fluid cavity, and wherein said piston means includes a second radial vane extending radially outwardly from said hollow shaft into said second fluid cavity to thereby separate the same into third and fourth antagonistic hydraulic chambers which are oriented to respectively act in concert with said first and second chambers, and further including two passive parallel fluid connection always open passageway means respectively communicating fluid constantly between said first and third chambers and constantly between said second and fourth chambers.

15. A coupling as claimed in claim 9 wherein said coupling is adapted for operation with a power means coupled for operating said driving shaft and wherein a preselected parameter of operation of said power means is dependent on said phase difference and said rib is shaped to cause the closed loop feedback control of said phase shifting means to maintain said parameter of operation of said power means in an operating range of said power means.

16. A coupling as claimed in claim 15 wherein said rib has a generally helical shape.

17. A coupling as claimed in claim 16 wherein said rib has a generally stepped shape.

18. A coupling as claimed in claim 9 wherein said hydraulic cylinder means and said piston means undergo relative movements of rotation, and wherein said hydraulic cylinder means includes a cylindrical case, respective transverse walls which axially limit said cylindrical case, and at least one radial partition to thereby define with said case and walls a fluid cavity; and wherein said piston means includes a hollow shaft defining said hollow cylinder and which extends through said transverse walls in a sealed manner and a radial vane extending radially outwardly from said hollow shaft into said fluid cavity to thereby separate the same into said first and second antagonistic hydraulic chambers, the interior of said hollow shaft receivably mounting said phase shift control movable element for relative rotation therein, said hydraulic passageway means being disposed in said radial vane and said common orifice thereof opening to the hollow of said shaft for communication with said first and second rotary valve chambers when registered therewith by movement of said rib relative to said shaft.

19. A coupling as set forth in claim 18 wherein said hydraulic cylinder has a second radial partition to thereby define with said case and walls a second fluid cavity, and wherein said piston means includes a second radial vane extending radially outwardly from said hollow shaft into said second fluid cavity to thereby separate the same into third and fourth antagonistic hydraulic chambers which are oriented to respectively act in concert with said first and second chambers, and further including two passive parallel fluid connection always open passageway means respectively communicating fluid constantly between said first and third chambers and constantly between said second and fourth chambers.

* * * * *

(12) EX PARTE REEXAMINATION CERTIFICATE (10693rd)

United States Patent
Melchior

(10) Number: US 5,507,254 C1
(45) Certificate Issued: Aug. 27, 2015

(54) VARIABLE PHASE COUPLING FOR THE TRANSMISSION OF ALTERNATING TORQUES

(76) Inventor: Jean F. Melchior, Teappes (FR)

Reexamination Request:
No. 90/013,298, Jul. 23, 2014

Reexamination Certificate for:
Patent No.: 5,507,254
Issued: Apr. 16, 1996
Appl. No.: 08/484,787
Filed: Jun. 7, 1995

Related U.S. Application Data

(63) Continuation of application No. 07/978,890, filed on Nov. 19, 1992, now Pat. No. 5,649,506, which is a continuation of application No. 07/576,451, filed on Sep. 13, 1990, now Pat. No. 5,645,017.

(30) Foreign Application Priority Data

Jan. 13, 1989 (FR) ...................................... 89 00366
May 1, 1990 (WO) ........................ PCT/FR90/00009

(51) Int. Cl.
*F01L 1/34* (2006.01)
*F16D 3/10* (2006.01)
*F16D 3/02* (2006.01)

(52) U.S. Cl.
CPC ... *F16D 3/10* (2013.01); *F16D 3/02* (2013.01)

(58) Field of Classification Search
None
See application file for complete search history.

(56) References Cited

To view the complete listing of prior art documents cited during the proceeding for Reexamination Control Number 90/013,298, please refer to the USPTO's public Patent Application Information Retrieval (PAIR) system under the Display References tab.

*Primary Examiner* — Jimmy G Foster

(57) ABSTRACT

One of the driving and driven parts of the coupling is connected to a cylinder and the other to a piston which delimit therebetween two antagonistic chambers. The chambers have a substantially constant volume, are filled with a practically incompressible hydraulic liquid, and are interconnected through two unidirectional circuits which have opposite directions and each a substantially constant volume. A distributing device 22 is so arranged as to either bring into action one or the other of the unidirectional circuits, or to neutralize both of them.

Attention is directed to the decision of *Melchior v. Hilite International, Inc.,* US District Court Northern Texas, 3:11cv3094-M, Court Order, Jul. 15, 2015. This reexamination may not have resolved all questions raised by this decision. See 37 CFR 1.552(c) for *ex parte* reexamination and 37 CFR 1.906(c) for *inter partes* reexamination.

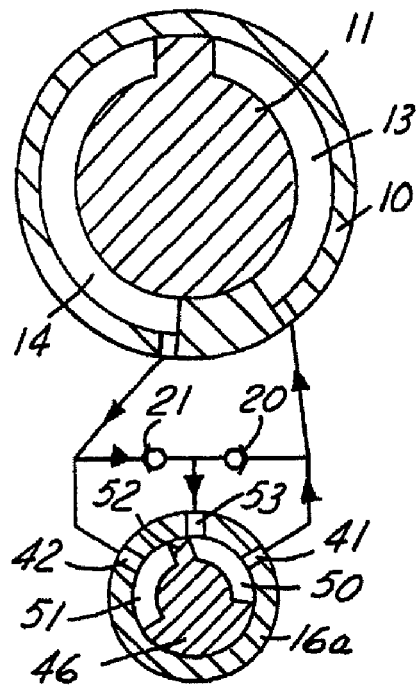

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claim 5 is confirmed.

Claims 1-4 and 6-19 were not reexamined.

\* \* \* \* \*